June 27, 1961   C. PONS   2,990,130
SPINNING REEL
Filed June 12, 1959   2 Sheets-Sheet 2
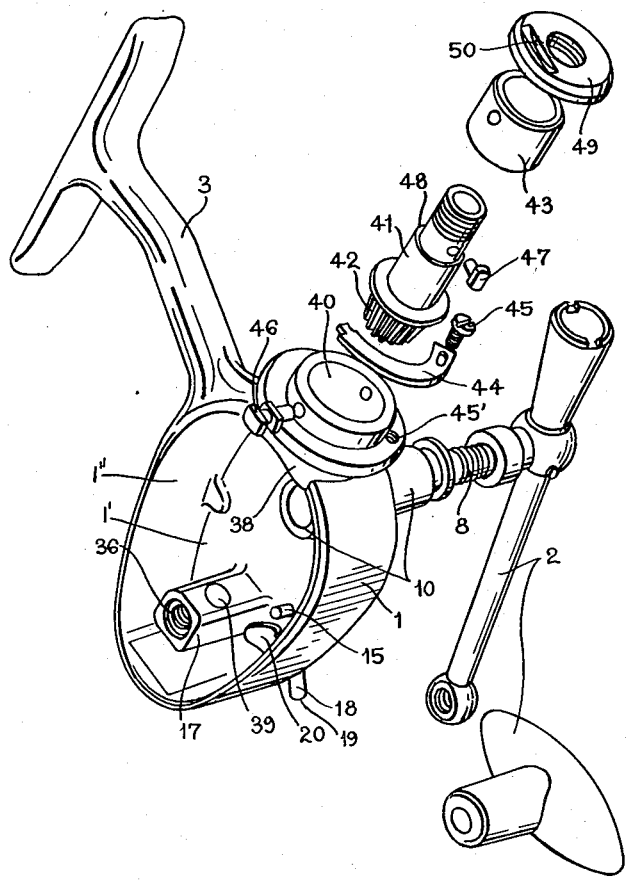
FIG. 3
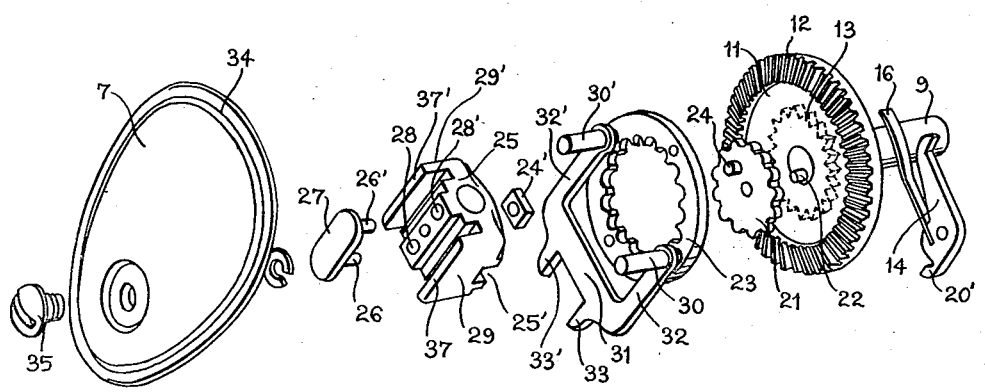

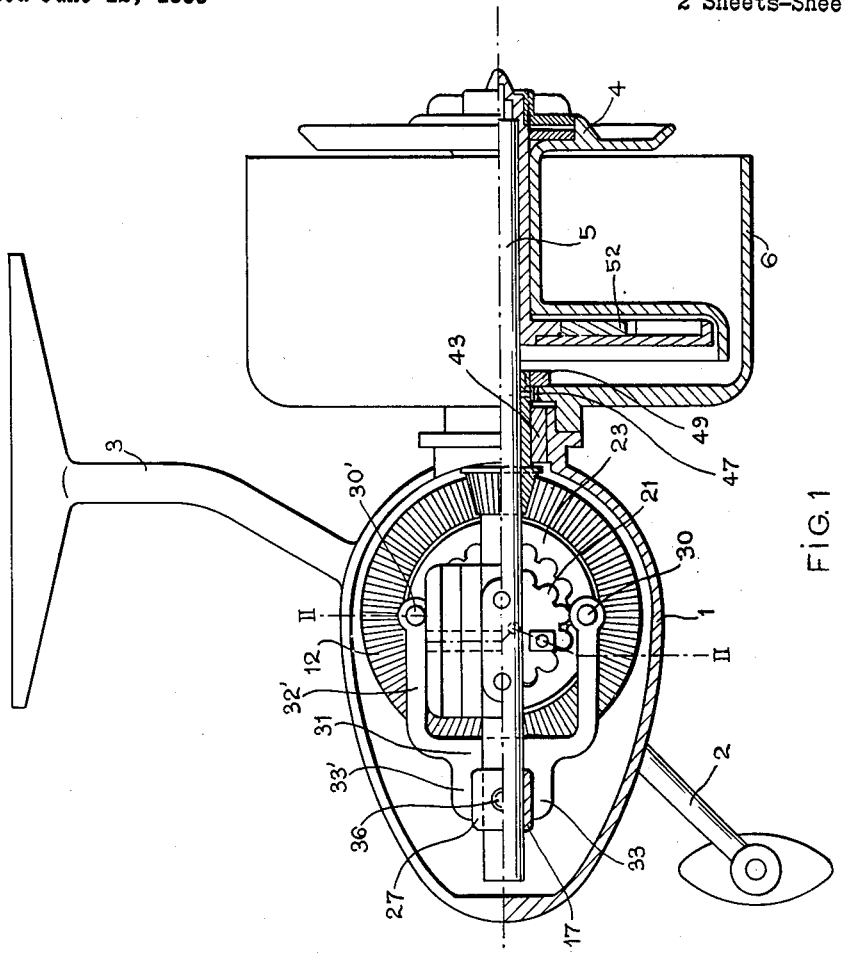
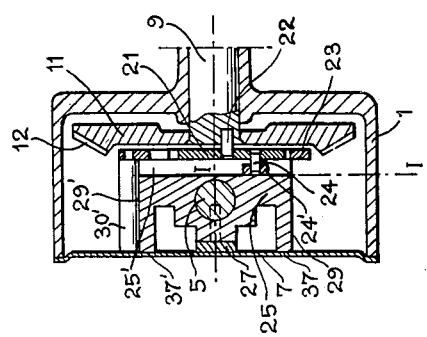

United States Patent Office 2,990,130
Patented June 27, 1961

2,990,130
SPINNING REEL
Charles Pons, Cluses, France, assignor to Etablissements Carpano & Pons, Cluses, France, a corporation of France
Filed June 12, 1959, Ser. No. 819,950
Claims priority, application France Nov. 6, 1958
3 Claims. (Cl. 242—84.21)

The present invention relates to a spinning reel of the type having a line spool which, only during the recovery or rewinding of the fishing line, is actuated in a reciprocating longitudinal motion and is housed inside the rotating head provided with a collector or pick-up having the shape of a hook or a loop to secure the guiding of the line during the rotation of the head actuated by a crank. The invention aims particularly at simplifying the transmission members controlling the movements of the spool and of the head and at supplying an assembly which allows the complete disassembling of the mechanism to be performed without any tools, a coin being sufficient to separate the various members connected by a small number of screws or nuts.

The reel, object of the present invention, is essentially characterized in that all of the members controlling the axial reciprocating motion, particularly the eccentric controlling the reciprocating motion of the spool shaft, the reducing gear and the slide driven by said eccentric, are assembled by a simple fitting in a frame having the shape of an oblong casing and are held in place by the lid of this casing, contacting a friction surface on said slide.

Other characteristics of the invention advantageously completing the above arrangement will appear more clearly from the following specification given by way of example of a reel according to the invention.

FIGURE 1 is an axial elevation section.
FIGURE 2 is a cross section along line II—II of FIGURE 1 of the frame or casing containing the transmission members.
FIGURE 3 is an exploded view showing the members contained in the frame.

As shown in FIGURE 1, the reel according to the invention includes, like most of the reels of the type to which it belongs, a frame 1 constituted by a casing containing the transmission gearing, actuated by a crank 2 and provided with a stand 3 to be fixed upon the fishing rod. The spool 4 upon which the line is wound is fixed upon the shaft 5 and the mechanisms hereafter described impart to this spool an axial reciprocating motion while a rotating motion is imparted to the outer rotating head 6 which supports the pick-up (not shown) and is provided in a known way with an automatic release device actuated by the rotation of the rotating head.

According to the invention, the frame 1 is constituted by a casing having its bottom 1' and lateral wall 1" made of one piece (instead of being made of two half portions) and provided with a flat lid 7. The shaft 8 (FIG. 3), supporting the crank 2, is connected in a known way with a shaft 9 penetrating in the casing through the tubular bearing 10 and supporting a wheel 11: the wheel 11 bears on its upper face a bevelled toothed ring 12 and on its lower face a ratchet toothing 13 (shown in dotted lines) which can be engaged by the non-return pawl 14 pivoted on the pin 15 integral with the bottom of the casing and kept in engagement with the ratchet by a set spring 16 bearing upon the projection 17, provided inside the casing 1: the pawl is releasable by means of a small pivoting lever 18, one end 19 of which extends outside the casing while the other end is provided with a hook 20 engaging the hook 20' provided at the end of the pawl. The central part of the wheel 11, inside the ring 12, is recessed to receive a pinion 21, having rounded teeth, loosely mounted on an eccentric pin 22 supported by the shaft 9: this pinion meshes with the inner toothing of a stationary ring 23 also housed in the recess in the ring 11 and centered on the axis of shaft 9 of ring 11. The assembly of the eccentric pinion 21 and of the ring 23 forms thereby an eccentric and a speed reducing gear, as described in my previous U.S. Patent No. 2,726,052. The pinion 21 bears a pin 24 meshing with a sliding block 24' movable in a transverse groove 25' on the lower face of a slide 25 interlocked with the shaft 5 by pins 26, 26' connected by a small bar 27 and passing through bores 28, 28' in said slide. The small bar 27 is placed under the lid 7 and very close to same, thus preventing the pins from falling outside. The slide 25 has two side flanges forming ribs 29, 29', the upper faces 37, 37' of which constitute friction surfaces into contact with the inner face of the lid 7. During the motion of the slide actuated by the eccentric, this friction absorbs the torsional stresses sustained by the axis of the reel. The fixing of the ring 23 is obtained by means of the double fork 31, the arms 32, 32' of one of the forks being provided with holes in which are inserted rods 30, 30', for longitudinally guiding the axial reciprocating motion of slide 25 while the fork 33, 33' is fitted on the square edged projection 17 of the frame.

The inner face of the lid 7 is close to the upper ends of the two rods 30, 30', fixed on the ring 24 to maintain the whole assembly in the proper position. The lid 7 is held in position by the insertion of its front edge under a small flange 38 (FIG. 3) of the frame and, in addition, is tightened by the screw 35 screwed in the tapped bore 36 in the projection 17.

The shaft 5, bearing the spool 4 and upon which the slide 25 is pinned, is first guided in the horizontal bore 39 in the projection 17 and, when coming out of the frame through the aperture 40 (FIGURE 3), bears an idle sleeve 41 which supports at its inner end a bevel pinion 42 meshing with the bevelled ring 12. The sleeve 41 rotates in a removable bearing 43 which is inserted in the bore 40 in the frame and is held in position by a pin 46: a leaf-spring 44 fixed on the frame by the screw 45, inserted in a hole 45', maintains the pin 46 in position. The head of the pin 46 acts also as a trigger for the pick-up upon rotation of the rotatable head 6, which is keyed on the sleeve 41 by the removable key 47 and is tightened from inside against the shoulder 48 of this sleeve by a large nut 49, preferably made of a plastic material and offering an eccentric groove 50 by means of which the nut can be unscrewed with a coin. Thus, the shaft 5 of the spool is guided in the sleeve 41 in the vicinity of the spool 4 and, in addition, its other end is guided in the bore 39 in the projection 17, whereby a firm support is obtained. The spool is provided in a known way with a trigger cooperating with a ratchet 52 supported by the shaft 5.

One sees that the dismantling of all the mechanism of the reel is carried out by unscrewing with a coin the nut 49 of the rotating head and the tightening screw 35 of the lid of the frame: thereafter, all the other members, removably interlocked by pins or keys, are separated or assembled without any difficulty, thereby allowing easy cleaning and repair of all the members of the apparatus.

What is claimed is:
1. A spinning reel having a line spool for reciprocating in a rotatable head comprising: a gear case having a bottom normal to and integral with a peripheral side wall, said side wall having a wall opening and said bottom having a bottom opening; a projection on said bottom normal thereto and opposite said wall opening, said projection having opposite flat sides and a free end and enclosed by said peripheral wall, the free end of said projection having a longitudinal hole tapped therein, and the projection having a transverse hole opposite said wall opening with a common center axis therewith; a lid for engaging said peripheral wall opposite said bottom for closing said gear case, said lid having an opening congruent with the tapped longitudinal hole in the free end of said projection; a first shaft, having two oppositely disposed ends, positioned in said gear case with one end extending through the side wall opening for rigidly attaching to and supporting the line spool, and the other end slidably mounted in said transverse hole; a sleeve having oppositely disposed ends slidably mounted on the first shaft where it passes through the wall opening, one sleeve end having a screw thread thereon and the other sleeve end defining a bevel gear; a bushing pinned in said wall opening for rotatably supporting said sleeve in the gear case with the threaded end extending outside said gear case for attaching to said rotatable head, and the bevel gear end extending inside said gear case; a second shaft journaled in the bottom opening and having an inner end inside the gear case and an outer end extending outside said gear case, a crank on said outer end for manually rotating said second shaft; a first eccentric pin mounted on the inner end of said second shaft and in eccentric prolongation thereof and rotatable therewith; a wheel mounted concentrically on said second shaft adjacent the bottom of the gear case for rotation with the second shaft, said wheel having beveled gear teeth around its perimeter complementary to the gear teeth of said sleeve bevel gear end and engaged therewith for rotating said sleeve; a pinion gear concentrically and rotatably mounted on said first eccentric pin for moving in an orbit around said second shaft, said pinion gear having a second eccentric pin mounted eccentrically thereon and extending parallel to and in the same direction as said first eccentric pin; a double forked frame disposed in said gear case and having oppositely disposed ends, the first fork end engaging said opposite flat sides of the bottom projection for rigidly fixing the frame against rotation, and the second fork end having parallel holes therein; a ring gear disposed concentric with said wheel and axially adjacent thereto with internal teeth for meshing with the pinion gear as said pinion gear is rotated on said first eccentric pin; parallel guide posts diametrically fixed to said ring gear and similarly extending parallel therefrom toward said lid, said guide posts respectively passing through the respective holes in the second forked end of the double fork frame for fixing the ring gear against rotation; a slide pinned on said first shaft to slidably move therewith between said guide posts, said slide having a transverse groove normal to said first shaft for engaging the second eccentric pin therein, said pin transversely oscillating in said transverse groove and longitudinally oscillating said slide and first shaft as said pinion gear is rotated around the ring gear on the first eccentric pin as said second shaft is rotated by said hand crank, and said slide having longitudinal ridges slidably engaged by said lid to hold said pinion gear and slide on their respective eccentric pins and said pinion gear meshed with said ring gear; a screw adapted to pass through the opening in said flat lid and threaded to engage said tapped hole in the projection for securing the lid to the gear case, the screw having a slotted head for easy engagement by any object fitting in said slotted head to operate said screw.

2. A spinning reel as described in claim 1 and further comprising; a nut threaded on the screw threaded end of the sleeve for securing the rotatable head thereon, said nut having an eccentric groove on a surface normal to said threads for engagement by any object fitting in said groove to operate the nut, whereby the reel is held in operative assembly only by said screw and nut for quick disassembly.

3. A spinning reel having a line spool for reciprocating in a rotatable head comprising; a gear case having a bottom normal to and integral with a peripheral side wall, said side wall having a wall opening and said bottom having a bottom opening; a projection on said bottom normal thereto and spaced from the peripheral side wall, said projection having a free end having a longitudinal hole tapped therein, and the projection having a transverse hole opposite said wall opening and coaxial therewith; a lid engaging said peripheral wall opposite said bottom to close said gear case, said lid having an opening aligned with the tapped longitudinal hole in the free end of said projection; a first shaft, having two oppositely disposed ends, positioned in said gear case with one end extending through the side wall opening for rigidly attaching to and supporting the line spool, and the other end slidably mounted in said transverse hole; a sleeve having oppositely disposed ends slidably mounted on the first shaft where it passes through the wall opening, one sleeve end having a screw thread thereon and the other sleeve end defining a bevel gear; a bushing in said wall opening for rotatably supporting said sleeve in the gear case for attaching to said rotatable head, and the bevel gear end extending inside said gear case; a second shaft journaled in the bottom opening and having an inner end inside the gear case and an outer end extending outside said gear case, a crank on said outer end for manually rotating said second shaft; a wheel mounted concentrically on said second shaft adjacent the bottom of the gear case for rotation with the second shaft, said wheel having beveled gear teeth around its perimeter complementary to the gear teeth of said sleeve bevel gear end and engaged therewith for rotating said sleeve and attached rotatable head; means for reciprocating said first shaft including reduction gear means driven from said wheel, a reciprocable slide driven by said reduction gear means and means connecting said slide to said first shaft, said reduction gear means, slide and connecting means being assembled in superposed reration between said wheel and lid and held in assembled relation by said lid; a screw having a slotted head and a threaded shank adapted to pass through the opening in said flat lid and engage said tapped hole in the projection for securing said lid to the gear case and said bevel gears and reciprocating means therein.

References Cited in the file of this patent
UNITED STATES PATENTS

| | | |
|---|---|---|
| 2,615,647 | Palmer | Oct. 28, 1952 |
| 2,726,052 | Pons | Dec. 6, 1955 |
| 2,758,801 | Bonanno | Aug. 14, 1956 |